(12) United States Patent
Wang et al.

(10) Patent No.: US 11,828,646 B2
(45) Date of Patent: Nov. 28, 2023

(54) OPTOELECTRONIC UNIT MEASURING DEVICE

(71) Applicants: Yu-Yen Wang, Taoyuan (TW); Kuo-Wei Huang, Taoyuan (TW); Szu-Yuan Weng, Taoyuan (TW)

(72) Inventors: Yu-Yen Wang, Taoyuan (TW); Kuo-Wei Huang, Taoyuan (TW); Szu-Yuan Weng, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 173 days.

(21) Appl. No.: 17/109,165

(22) Filed: Dec. 2, 2020

(65) Prior Publication Data

US 2021/0172793 A1 Jun. 10, 2021

(30) Foreign Application Priority Data

Dec. 5, 2019 (TW) .................................. 108144414

(51) Int. Cl.
*G01J 1/42* (2006.01)
*G02B 7/04* (2021.01)

(52) U.S. Cl.
CPC .............. *G01J 1/4257* (2013.01); *G02B 7/04* (2013.01)

(58) Field of Classification Search
CPC .................................. G01J 1/4257; G02B 7/04
See application file for complete search history.

(56) References Cited

FOREIGN PATENT DOCUMENTS

| JP | 2001004491 A | * | 1/2001 | |
|---|---|---|---|---|
| JP | 2009186753 A | * | 8/2009 | |
| JP | 2016170104 A | * | 9/2016 | ............. B23K 26/00 |

* cited by examiner

*Primary Examiner* — Uzma Alam
*Assistant Examiner* — Mohamed Doumbia

(57) ABSTRACT

Herein disclosed is an optoelectronic unit measuring device comprising an objective lens, an imaging lens, a photographing lens, and a focus adjustment module disposed in a first light path. The objective lens receives a first testing light and converts the first testing into a second testing light. The imaging lens receives the second testing light and converts the second testing light into a third testing light. The photographing lens receives the third testing light and measures beam characteristic. The focus adjustment module selectively provides a first light transmitting member in the first light path, and adjusts the third testing light to focus at a first focus position or a second focus position. Wherein the focus adjustment module comprises a first carrier plate having a first area with the first light transmitting member, and moves the first carrier plate to selectively align the first area with the first light path.

13 Claims, 7 Drawing Sheets

OPTOELECTRONIC UNIT MEASURING DEVICE

CROSS REFERENCE TO RELATED APPLICATION

The present application claims priority to Taiwan patent application Serial No. 108144414 filed on Dec. 5, 2019, the entire content of which is incorporated by reference to this application.

BACKGROUND OF THE INVENTION

1. Field of the Invention

The present invention pertains to a device for measuring an electronic unit, more specifically to a device for measuring characteristics of an optoelectronic unit.

2. Description of the Prior Art

With the progress of optoelectronic technology, it is currently known that many media can be used to generate lasers, for example, lasers can be generated through media such as gases, chemicals, or semiconductors. At present, it is common to use semiconductors to generate lasers, and such semiconductors are generally called laser diodes. In practice, after the laser diodes are manufactured, many optical inspections are required to ensure the stability of the laser quality. However, when inspecting the laser light emitted by the laser diode, an object plane of an objective lens or an image plane of an imaging lens need to be moved frequently in many measurements, for example, the measurements related to beam characteristics such as beam waists and divergence angles, and near field parameters such as numerical aperture. Person having ordinary skill in the art can understand that moving the objective lens or the imaging lens frequently will cause the corresponding optical system to be unstable, and it is also prone to measurement errors.

In addition, moving the object plane of the objective lens or the image plane of the imaging lens will not only affect the stability of the optical system, but also lengthen the measuring time. Accordingly, the industry needs a new optoelectronic unit measuring device, not only to maintain the stability of the objective lens and the imaging lens during the measurement, but also to complete various measurements quickly.

SUMMARY OF THE INVENTION

The present invention provides an optoelectronic unit measuring device, which can change the focus position between the imaging lens and the photographing lens while fixing the objective lens and the imaging lens, thereby speeding up the efficiency for measuring the characteristics of the optoelectronic unit.

The present invention discloses an optoelectronic unit measuring device which comprises an objective lens, an imaging lens, a photographing lens, and a focus adjustment module. The objective lens, disposed in a first light path, receives a first testing light and converts the first testing into a second testing light. The imaging lens, disposed in the first light path, receives the second testing light and converts the second testing light into a third testing light. The photographing lens, disposed in the first light path, receives the third testing light and measures a beam characteristic of the third testing light. The focus adjustment module, controlled by a test command to selectively provide a first light transmitting member in the first light path, adjusts the third testing light to focus at a first focus position or a second focus position. Wherein the focus adjustment module comprises a first carrier plate, the first carrier plate has a first area, the first light transmitting member is disposed in the first area, and the focus adjustment module is controlled by the test command to move the first carrier plate to selectively align the first area with the first light path.

In some embodiment, when the first area is aligned with the first light path, the first light transmitting member can be used to refract the third testing light, and the third testing light is adjusted to focus at the first focus position. Besides, the first carrier plate can have a second area, a second light transmitting member can be disposed in the second area, and the focus adjustment module is further controlled by the test command to move the first carrier plate to selectively align the first area or the second area with the first light path. In addition, when the second area is aligned with the first light path, the second light transmitting member can be used to refract the third testing light, and the third testing light can be adjusted to focus at the second focus position, the second focus position is different from the first focus position.

In some embodiment, the first light transmitting member and the second light transmitting member can both be transparent flat plates, the first light transmitting member and the second light transmitting member can have the same refractive index, and the thickness of the first light transmitting member and the thickness of the second light transmitting member are not the same. Furthermore, the first light transmitting member and the second light transmitting member can both be transparent flat plates, and the first light transmitting member and the second light transmitting member can have different refractive indexes.

In some embodiment, the first carrier plate further can have a through hole, the focus adjustment module can be further controlled by the test command to move the first carrier plate to selectively align the first area or the through hole with the first light path. When the through hole is aligned with the first light path, the focus position of the third testing light can be the second focus position, and the second focus position is different from the first focus position. Besides, the focus adjustment module can further comprise a second carrier plate, the second carrier plate can have a third area, the third light transmitting member can be disposed in the third area, and the focus adjustment module can be further controlled by the test command to move the second carrier plate to selectively align the third area with the first light path.

In some embodiment, when the photographing lens measures the beam characteristics of the third testing light, the beam characteristics of the third testing light can comprise a beam waist, a divergence angle, and a numerical aperture of the third testing light. A relative position of the imaging lens and the photographing lens can be fixed. The optoelectronic unit measuring device can further comprise a first filter, disposed in the first light path and located between the objective lens and the imaging lens, for reducing a light intensity of the second testing light. Moreover, the photographing lens is located at a focal plane of a light exiting side of the imaging lens in the first light path, the first testing light is emitted by an optoelectronic unit, and the optoelectronic unit is located at a focal plane of an incident side of the objective lens in the first light path.

Based on the above, the optoelectronic unit measuring device of the present invention can selectively add light transmitting members between the imaging lens and the photographing lens, so that after the light can be refracted by the light transmitting members, the focus position of the imaging lens and the photographing lens can be changed. Therefore, optoelectronic unit measuring device of the present invention can not only maintain the stability of the optical architecture, but also accelerate the efficiency for measuring the characteristics of the optoelectronic units without moving the objective lens or the imaging lens.

BRIEF DESCRIPTION OF THE APPENDED DRAWINGS

DETAILED DESCRIPTION OF THE INVENTION

The features, objections, and functions of the present invention are further disclosed below. However, it is only a few of the possible embodiments of the present invention, and the scope of the present invention is not limited thereto; that is, the equivalent changes and modifications done in accordance with the claims of the present invention will remain the subject of the present invention. Without departing from the spirit and scope of the invention, it should be considered as further enablement of the invention.

Figure 1:
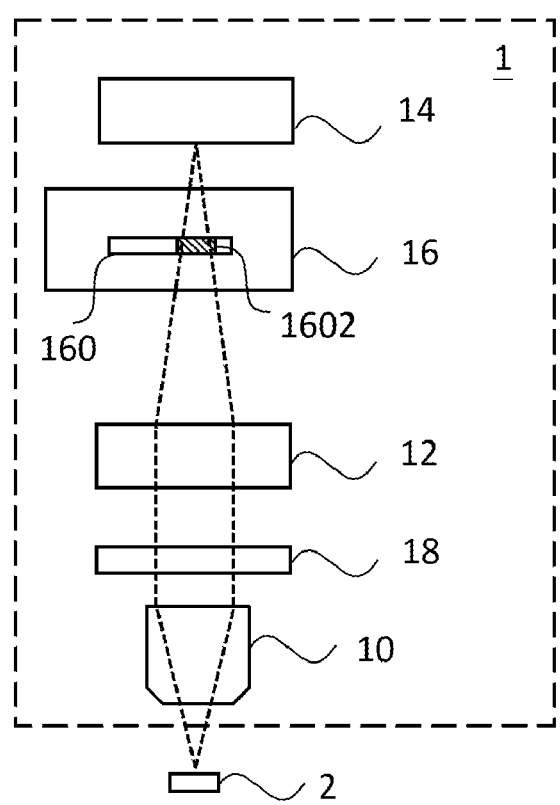
FIG. 1 is a schematic framework diagram of an optoelectronic unit measuring device in accordance with an embodiment of the present invention.

Please refer to FIG. 1, FIG. 1 is a schematic framework diagram of an optoelectronic unit measuring device in accordance with an embodiment of the present invention. As shown in FIG. 1, the optoelectronic unit measuring device 1 of this embodiment is used to measure the characteristic of an optoelectronic unit 2 shown in FIG. 1. This embodiment does not limit the type of the optoelectronic unit. For example, the optoelectronic unit may be a laser diode which may be classified as a gas laser element or a chemical laser element. The optoelectronic unit measuring device 1 can be used to measure a beam characteristic of the optoelectronic unit 2, especially for measuring near field parameters of the laser light emitted by the optoelectronic unit 2. For example, the optoelectronic unit measuring device 1 can be used to measure the near field parameters such as a beam waist (W0), a divergence angle (θ), and a numerical aperture (NA) of the laser light. Traditionally, measuring the near field parameters of the optoelectronic unit 2 requires moving the objective lens or the imaging lens within a certain range. This embodiment proposes an optical system that does not require moving the objective lens or the imaging lens. The optoelectronic unit measuring device 1 shown in FIG. 1 has an objective lens 10, an imaging lens 12, a photographing lens 14, and a focus adjustment module 16 between the imaging lens 12 and the photographing lens 14. In practice, the objective lens 10, the imaging lens 12, the photographic lens 14, and the focus adjustment module 16 are all disposed in a first light path. The following describes each element in the first light path in order.

The objective lens 10 is arranged in the first light path to receive the laser light (the first testing light) emitted by the optoelectronic unit 2. The dotted line between the optoelectronic unit 2 and the objective lens 10 in FIG. 1 is used to indicate that the first testing light enters the optoelectronic unit measuring device 1 along the first light path, and does not limit the actual size of the objective lens 10 and the optoelectronic unit 2, nor limit the angle at which the optoelectronic unit 2 emits the first testing light. Different from the laser emitter that has been assembled, the optoelectronic unit 2 has not been assembled with a proper lens, so the laser light (the first testing light) emitted by the optoelectronic unit 2 is not yet a parallel light. Person having ordinary skilled in the art knows that if the light source is placed on the focal plane on one side of a convex lens, the light emitted by the light source can be converted into the parallel light and can be emitted from the other side of the convex lens. In an example, the objective lens 10 may be the convex lens, and the optoelectronic unit 2 may be placed on the focal plane of the incident side of the objective lens 10, so that the non-parallel laser light (the first testing light) can be converted into parallel laser light (the second testing light). In other words, the objective lens 10 can convert the first testing light into the second testing light with parallel beam characteristics.

In addition, the imaging lens 12 is also disposed in the first light path to receive the laser light (the second testing light) parallel to the light exiting side of the objective lens 10. As shown in FIG. 1, the dotted line between the objective lens 10 and the imaging lens 12 is used to indicate that the second testing light enters the imaging lens 12 along the first light path. In practice, the imaging lens 12 may be, but not limit to, a tube lens. In addition, because the laser light is converted into the parallel light, it can theoretically be transmitted to any distance along a straight line, which means it can extend the length of the first light path. For example, extending the first light path can be regarded as increasing the distance between the objective lens 10 and the imaging lens 12, so that there is a chance that more optical elements can be placed between the objective lens 10 and the imaging lens 12. However, person having ordinary skilled in the art would know that due to the parallel light is not focused (having no focus) and cannot image. Therefore, the imaging lens 12 may be a convex lens and has a focal plane. After the parallel laser light passes through the imaging lens 12, it can be converted into a non-parallel laser light (the third testing light), so that the third testing light can be imaged and measured. In an example, since the laser light emitted by the optoelectronic unit 2 has high intensity, in order to avoid overexposure of the photographing lens 14, the optoelectronic unit measuring device 1 may further comprise a (or more) filter 18, the filter 18 can be, but not limit to, disposed between the objective lens 10 and the imaging lens 12 as shown in FIG. 1.

The focus adjustment module 16 can receive the third testing light from the direction of the imaging lens 12, and can be controlled by an external test command to selectively provide a first light transmitting member 1602 in the first light path. The first light transmitting member 1602 can adjust the focus position of the third testing light to a first focus position or a second focus position. In practice, since the third testing light is already a non-parallel laser light, and will gradually focus as it advances. Therefore, the imaging plane position of the third testing light in the photographing lens 14 can be adjusted when the focus adjustment module 16 adjusts the focus position of the third testing light. In an example, the focus adjustment module 16 may have a corresponding structure so that the first light transmitting member 1602 can be provided in the first light path, or in other words, the focus adjustment module 16 may also make the first light transmitting member 1602 not be disposed in the first light path.

Following the above, the photographing lens 14 is also disposed in the first light path to measure the beam characteristics of the third testing light passing the focus adjustment module 16. As shown in FIG. 1, the dotted line from the imaging lens 12 to the focus adjustment module 16, and further from the focus adjustment module 16 to the photographing lens 14, is used to indicate that the third testing light along the first light path (from the imaging lens 12 to the photographing lens 14). In practice, when measuring the beam characteristics of the optoelectronic unit 2, it is necessary to slightly change the distance between the imaging lens 12 and the photographing lens 14 in the first light path (that is, the focal position of the third testing light) to measure the near field parameters such as the beam waist, the divergence angle, and the numerical aperture. The focus adjustment module 16 adjusts the imaging plane (focus plane) of the third testing light on the photographic lens 14, which can also be regarded as scanning the focus position of the third testing light dynamically. Noted that because the objective lens 10, the imaging lens 12, and the photographing lens 14 do not need to be moved, the stability of the optoelectronic unit measuring device 1 disclosed in this embodiment is better, and the speed of measuring the beam characteristic of the optoelectronic unit 2 can be faster.

Figure 2:
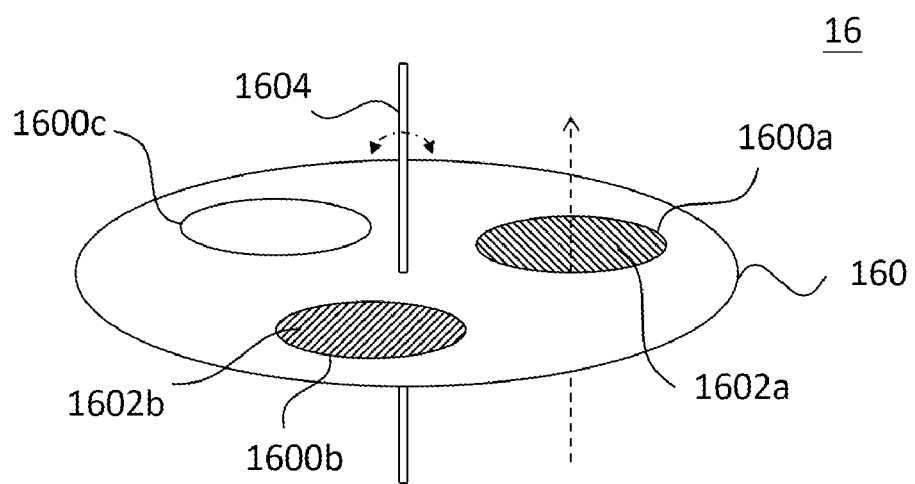
FIG. 2 is a schematic framework diagram of a focus adjustment module in accordance with an embodiment of the present invention.

In order to demonstrate the structure and operation of the focus adjustment module 16, please refer to FIG. 1 and FIG. 2. FIG. 2 is a schematic framework diagram of a focus adjustment module in accordance with an embodiment of the present invention. As shown in the figures, the focus adjustment module 16 may have a first carrier plate 160 and a plurality of areas may be defined in the first carrier plate 160, such as an area 1600*a*, an area 1600*b*, and an area 1600*c*. Although FIG. 2 shows that the first carrier plate 160 has three areas, the number of areas is not limited in this embodiment. In the example shown in FIG. 2, the first light transmitting member 1602*a* may be installed in the area 1600*a* (first area), and the second light transmitting member 1602*b* may be installed in the area 1600*b* (second area). Moreover, the area 1600*c* may not be provided with a light transmitting member but only a through hole.

The focus adjustment module 16 can be controlled by the test command to move the first carrier plate 160 to selectively align one of the areas (for example, the area 1600*a*) with the first light path. In practice, since the route of the first light path is fixed, it can be considered that the third testing light will be projected to a fixed spot on the first carrier plate 160. When the spot where the third testing light is projected exactly overlaps the area 1600*a*, it can be said that the area 1600*a* is aligned with the first light path. Taking the example shown in FIG. 2 as an example, the focus adjustment module 16 may further have a rotating shaft 1604, and the rotating shaft 1604 can be used to rotate any area to align with the first light path. Noted that this embodiment does not limit how the focus adjustment module 16 moves the first carrier plate 160 to align any area with the first light path. It can be seen from FIG. 1 and FIG. 2 that no matter which area of the first carrier plate 160 is aligned with the first light path, it has no effect on the third testing light before entering the first carrier plate 160, but the difference is the focus position of the third testing light leaving the first carrier plate 160.

In an example, the first light transmitting member 1602*a* and the second light transmitting member 1602*b* may both be transparent flat plates, and the refractive index of the first light transmitting member 1602*a* and the second light transmitting member 1602*b* may be the same. For example, the first light transmitting member 1602*a* and the second light transmitting member 1602*b* may both be made of glass (that is, the refractive index is the same), and both have a plate-like structure. The difference between the first light transmitting member 1602*a* and the second light transmitting member 1602*b* lies in the thickness. In other examples, the first light transmitting member 1602*a* and the second light transmitting member 1602*b* can also be made of different materials (that is, different refractive indexes), as long as the third testing light can pass the first light transmitting member 1602*a* or the second light transmitting member 1602*b* without interfering the measurement of the beam characteristics of the optoelectronic unit 2, the present embodiment does not limit the materials of the first light transmitting member 1602*a* and the second light transmitting member 1602*b*.

Figure 3:
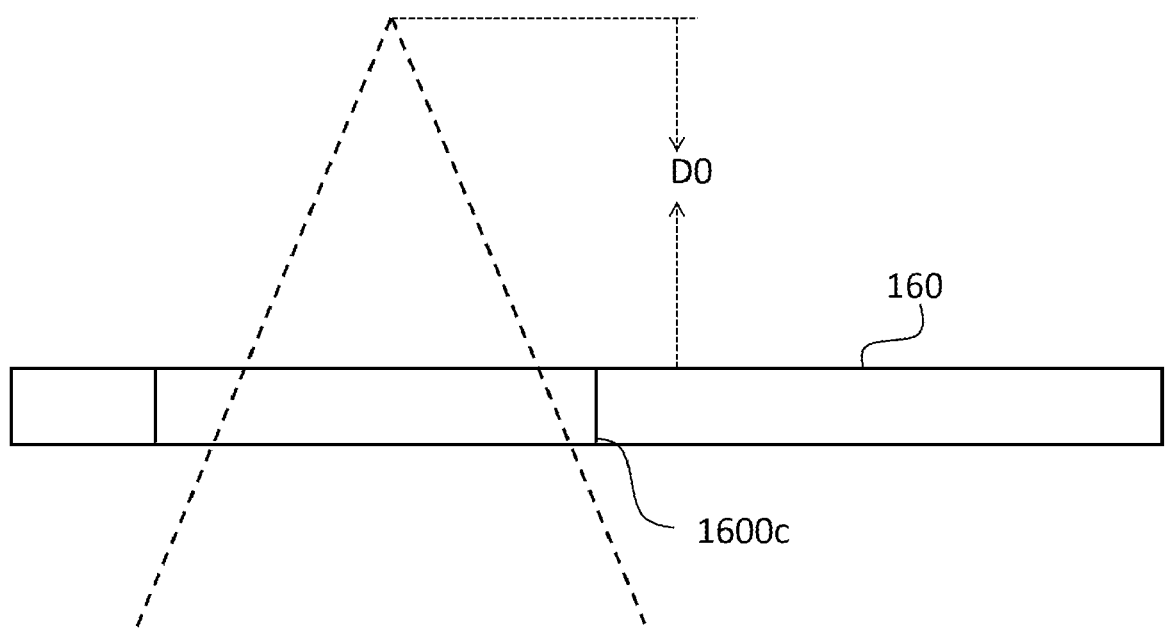
FIG. 3 is a schematic diagram showing the focus position of the third testing light in accordance with an embodiment of the present invention.
Figure 4:
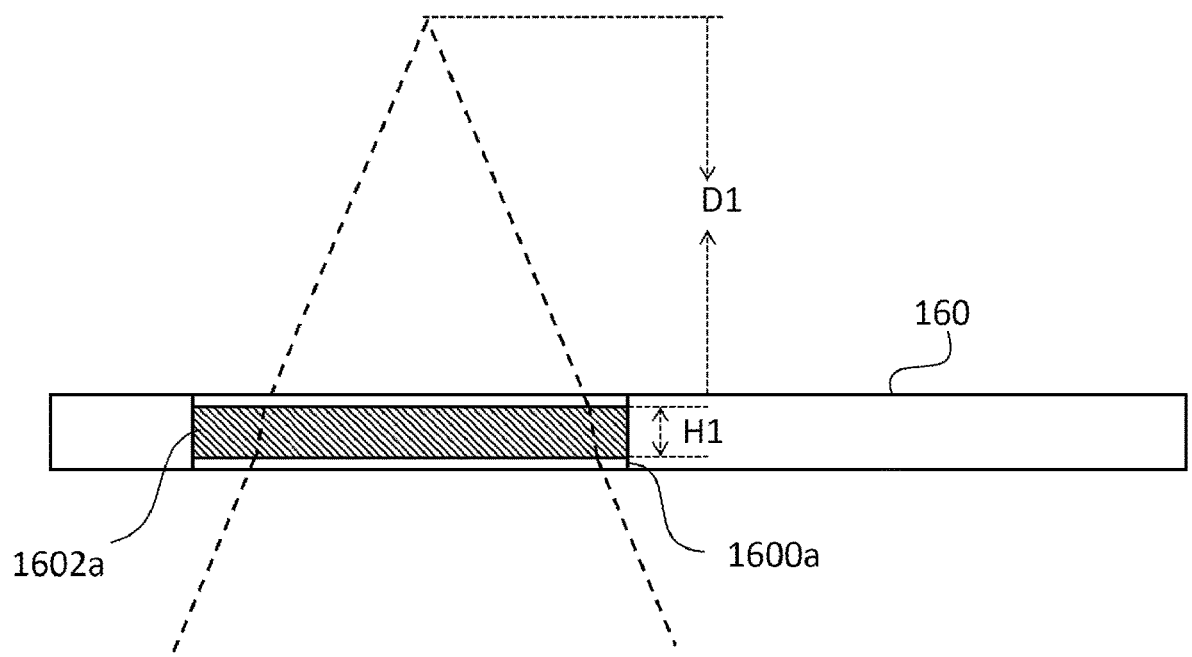
FIG. 4 is a schematic diagram showing the focus position of the third testing light in accordance with another embodiment of the present invention.
Figure 5:
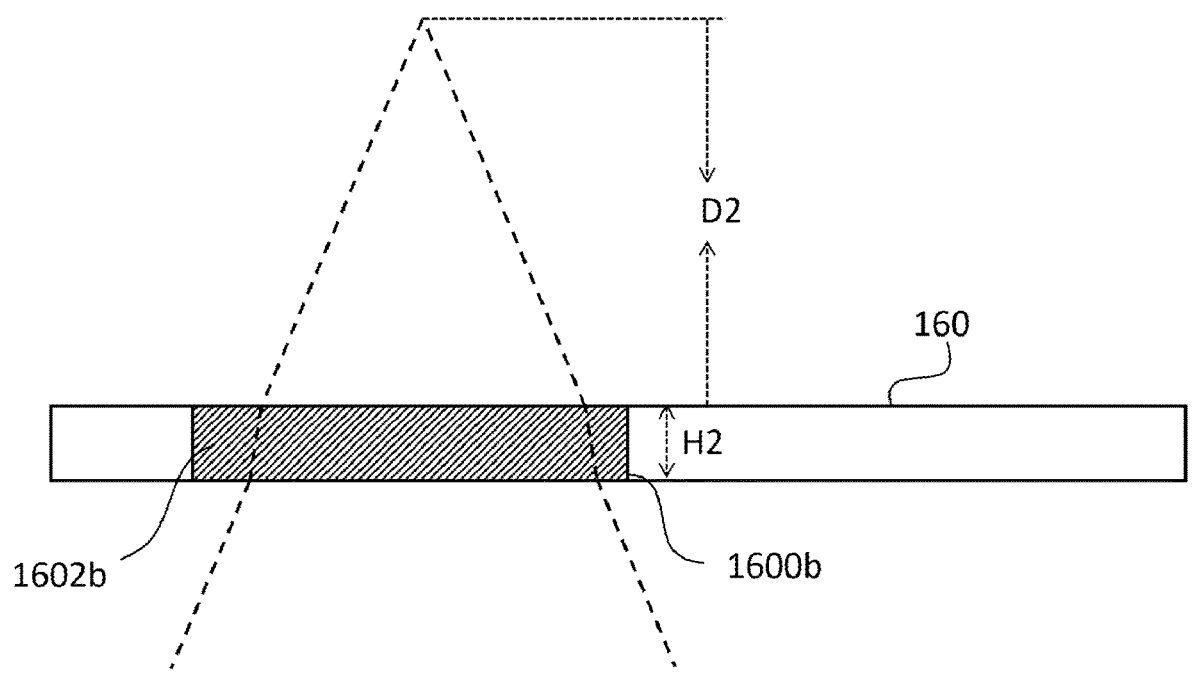
FIG. 5 is a schematic diagram showing the focus position of the third testing light in accordance with the other embodiment of the present invention.

In addition, in order to demonstrate how the focus adjustment module 16 dynamically changes the focus position of the third testing light, please refer to FIG. 2 to FIG. 5 together. FIG. 3 is a schematic diagram showing the focus position of the third testing light in accordance with an embodiment of the present invention, FIG. 4 is a schematic diagram showing the focus position of the third testing light in accordance with another embodiment of the present invention, and FIG. 5 is a schematic diagram showing the focus position of the third testing light in accordance with the other embodiment of the present invention. Taking FIG. 3 as an example, since the area 1600*c* of the first carrier plate 160 is only a through hole and is not installed with a light transmitting member, when the area 1600*c* is aligned with the first light path, the medium passed by the third testing light is not changed (for example, only air), so it will not be refracted. At this time, the focus position of the third testing light can be assumed to be D0 from the first carrier 160.

Taking FIG. 4 as an example, when the area 1600*a* is aligned with the first light path, the third testing light will be refracted by the first light transmitting member 1602*a* in the area 1600*a*, so it should be different from the example of FIG. 3. Assuming that the medium before and after the first light transmitting part 1602*a* is air, and the refractive index of air is less than the refractive index of the first light transmitting part 1602*a*. It should be understood that the focal position of the third testing light of FIG. 4 will be affected and different from FIG. 3. At this time, the focus position of the third testing light can be assumed to be D1 from the first carrier plate 160. In practice, when the incident angle of the third testing light is known, the refractive index of the first light transmitting member 1602*a* is known, and the thickness of the light transmitting member 1602*a* is known, the difference between D0 and D1 can be determined by the Snell's Law and can be easily calculated. In an example, D1 should be slightly larger than D0 which means that the focus adjustment module 16 adjusts the focus position (imaging plane position) of the third testing light on the photographing lens 14.

Taking FIG. 5 as an example, when the area 1600b is aligned with the first light path, the third testing light will be refracted by the second light transmitting member 1602b in the area 1600b. Assuming that the thickness H1 of the first light transmitting member 1602a and the thickness H2 of the second light transmitting member 1602b are different, person having ordinary skilled in the art should understand that the focal positions of the third testing light in FIG. 5 and in the FIG. 4 will be different. At this time, the focus position of the third testing light can be assumed to be D2 from the first carrier plate 160. In an example, when the refractive index of the first light transmitting member 1602a and the second light transmitting member 1602b are the same, and the thickness H2 of the second light transmitting member 1602b is greater than the thickness H1 of the first light transmitting member 1602a, it can be inferred D2 will also be slightly larger than D1. In practice, the thickness of the light transmitting member and the focus position can be organized into a corresponding relationship, for example, as shown in table 1 below.

TABLE 1

| being aligned with | thickness | focus position |
|---|---|---|
| 1600c | 0 | D0 |
| 1600a | H1 | D1 |
| 1600b | H2 | D2 |

It is worth mentioning that it is traditionally necessary to move the optical system so that the object distance between the objective lens and the laser diode can be changed in order to scan the laser diode to a certain depth. However, according to the above example, it can be seen that the focus adjustment module 16 of this embodiment can simply move the first carrier plate 160, so that the multiple areas on the first carrier plate 160 can be aligned with the first light path in a preset order. That is, the focus position between the imaging lens 12 and the photographing lens 14 can be changed from D0 to D2 without actually moving the imaging lens 12 or the photographing lens 14. It can be seen from this that the focus adjustment module 16 of this embodiment can dynamically change the focus position of the third testing light and scan the third testing light to measure the near field parameters such as the beam waist, the divergence angle, and the numerical aperture.

Figure 6:
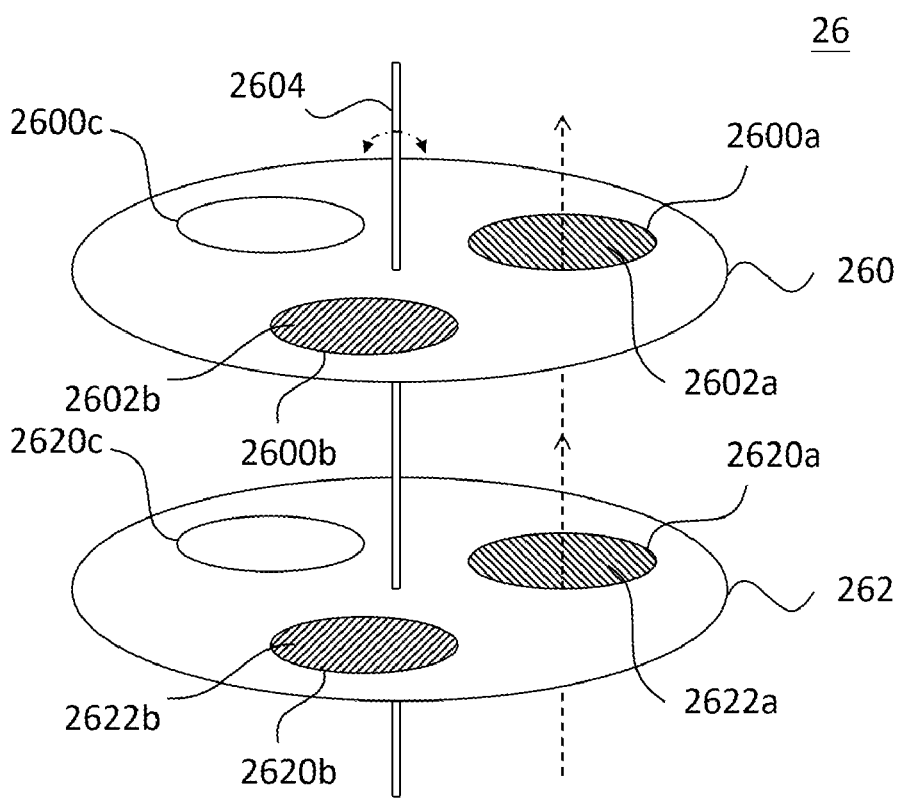
FIG. 6 is a schematic framework diagram of a focus adjustment module in accordance with another embodiment of the present invention.

This embodiment does not limit how many different light transmitting members can be installed in the first carrier plate 160, and also does not limit how many carrier plates can be installed in the focus adjustment module 16. Please refer to FIG. 2 and FIG. 6 together, FIG. 6 is a schematic framework diagram of a focus adjustment module in accordance with another embodiment of the present invention. The same as the previous embodiment, multiple areas may be defined in the first carrier plate 260, such as an area 2600a, an area 2600b, and an area 2600c. The area 2600a (first area) may be provided with a first light transmitting member 2602a. And, the area 2600b (the second area) may be provided with a second light transmitting member 2602b. Moreover, the area 2600c may not be provided with any light transmitting member, but only a through hole. In addition, the first carrier plate 260 can also be rotated by the rotation shaft 2604. Different from the previous embodiment, the focus adjustment module 26 may comprise a second carrier plate 262 in addition to the first carrier plate 260. Multiple areas may also be defined in the second carrier plate 262, such as an area 2620a, an area 2620b, and an area 2620c. The area 2620a (the third area) can be provided with a third light transmitting member 2622a, and the area 2620b (the fourth area) can be provided with a fourth light transmitting member 2622b. Moreover, the area 2620c may also not be provided with any light transmitting member, but only a through hole. For the convenience of description, the configuration of the second carrier plate 262 and the first carrier plate 260 are assuming the same as an example, but the present embodiment does not limit the second carrier plate 262 and the first carrier plate 260 have to be completely the same.

Since the two carrier plates can respectively use different areas to align with the first light path, the focus position between the imaging lens 12 and the photographing lens 14 can have more differences. Taking a practical example, assuming that the first light transmitting member 2602a and the third light transmitting member 2622a have the same material and thickness, and the second light transmitting member 2602b and the fourth light transmitting member 2622b have the same material and thickness, then the combination of the areas aligned with the first light path is shown in table 2.

TABLE 2

| being aligned with | thickness | focus position |
|---|---|---|
| 2600c + 2620c | 0 + 0 | D0 |
| 2600a + 2620c | H1 + 0 | D1 |
| 2600b + 2620c | H2 + 0 | D2 |
| 2600c + 2620a | 0 + H1 | D1 |
| 2600a + 2620a | H1 + H1 | D3 |
| 2600b + 2620a | H2 + H1 | D4 |
| 2600c + 2620b | 0 + H2 | D2 |
| 2600a + 2620b | H1 + H2 | D4 |
| 2600b + 2620b | H2 + H2 | D5 |

As can be seen from table 2, when the focus adjustment module 26 has two carrier plates, because the combined thickness of the light transmitting member is more diversified, more focus positions of the third testing light can be applied such as D3, D4 and D5 (not shown). For example, when the area 2600a and the area 2620a are aligned with the first light path, the third testing light will be refracted by the first light transmitting member 2602a in the area 2600a and the third light transmitting member 2622a in the area 2620a, respectively. In the case that the first light transmitting member 2602a and the third light transmitting member 2622a are the same, it means that the third testing light pass through the first light transmitting member 1602a having the thickness H1 twice, and the focus position of the third testing light can be assumed to be D3 from the first carrier plate 260. In addition, when the area 2600b and the area 2620a are aligned with the first light path, the third testing light will be refracted by the second light transmitting member 2602b in the area 2600b and the third light transmitting member 2622a in the area 2620a respectively, it means that the third testing light pass through one light transmitting member having the thickness H1 plus one light transmitting member having the thickness H2. At this time, the focal position of the third testing light can be assumed to be D4 from the first carrier plate 260.

In addition, when the area 2600b and the area 2620b are aligned with the first light path, the third testing light will be refracted by the second light transmitting member 2602b in the area 2600b and the fourth light transmitting member 2622b in the area 2620b, respectively. In the case that the second light transmitting member 2602b and the fourth light transmitting member 2622b are the same, it means that the third testing light pass through the second light transmitting member 2602b having the thickness H2 twice, and the focus position of the third testing light can be assumed to be D5 from the first carrier plate 260. In other words, the focus adjustment module 26 of this embodiment can simply move the first carrier plate 260 and the second carrier plate 262, more focus positions (D0 to D5) between the imaging lens 12 and the photographing lens 14 can be created without actually moving the imaging lens 12 or the photographing lens 14 by the combination of aligning multiple areas on the first carrier plate 260 and the second carrier plate 262 with the first light path in a preset sequence. Person having ordinary skilled in the art should understand that if the thicknesses of the first light transmitting member 2602a and the third light transmitting member 2622a are different, and the thickness of the second light transmitting member 2602b and the fourth light transmitting member 2622b are different, then the thickness of the light transmitting members can have more combinations, so that there is possible to adjust the focus position at very small scale or very fine intervals.

Figure 7:
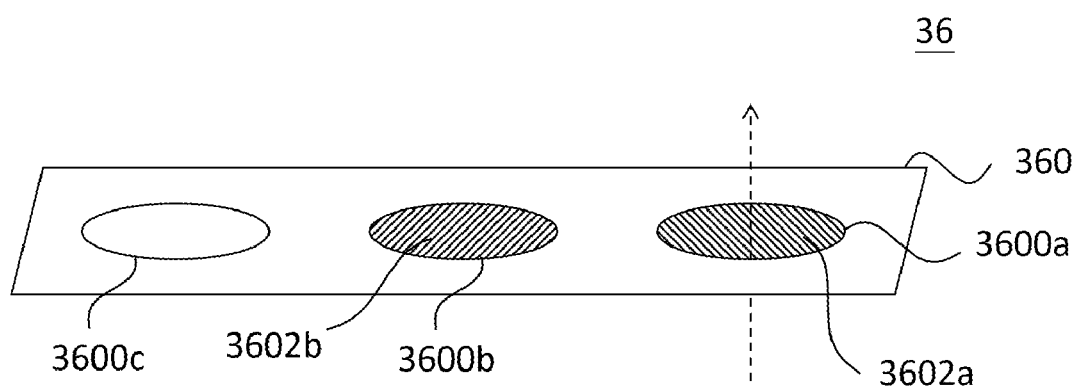
FIG. 7 is a schematic framework diagram of a focus adjustment module in accordance with the other embodiment of the present invention.

The aforementioned embodiments of FIG. 2 and FIG. 6 use a rotating shaft to drive the carrier plate, so that the carrier plate can be, but not limit to, rotated to align different areas with the first light path. Please refer to FIG. 2 and FIG. 7, FIG. 7 is a schematic framework diagram of a focus adjustment module in accordance with the other embodiment of the present invention. The same as the previous embodiment, multiple areas can also be defined in a first carrier 360 of a focus adjustment module 36, such as an area 3600a, an area 3600b, and an area 3600c. A first light transmitting member 3602a may be installed in the area 3600a (first area), and the second light transmitting member 3602b may be installed in the area 3600b (the second area). In addition, the area 3600c may not be provided with a light transmitting member, but only a through hole. Different from the previous embodiment, the focus adjustment module 36 may not have a rotating shaft, that is, the first carrier plate 360 may not rely on the rotating shaft to align the designated area with the first light path. For example, the focus adjustment module 36 may have a sliding rail (not shown) and a driving motor (not shown). The first carrier plate 360 may be installed on the sliding rail, driven by the driving motor, and able to align the designated area to the first light path.

In summary, the optoelectronic unit measuring device of the present invention can selectively add light transmitting members between the imaging lens and the photographing lens, so that after the light can be refracted by the light transmitting members, the focus position of the imaging lens and the photographing lens can be changed. Therefore, optoelectronic unit measuring device of the present invention can not only maintain the stability of the optical architecture, but also accelerate the efficiency for measuring the characteristics of the optoelectronic units without moving the objective lens or the imaging lens.

What is claimed is:

1. An optoelectronic unit measuring device, comprising:
   an objective lens, disposed in a first light path, for receiving a first testing light and converting the first testing light into a second testing light;
   an imaging lens, disposed in the first light path, for receiving the second testing light and converting the second testing light into a third testing light;
   a photographing lens, disposed in the first light path, for receiving the third testing light; and
   a focus adjustment module, controlled by a test command to selectively provide a first light transmitting member in the first light path, for adjusting the third testing light to focus at a first focus position or a second focus position;
   wherein the focus adjustment module comprises a first carrier plate, the first carrier plate has a first area, the first light transmitting member is disposed in the first area, and the focus adjustment module is controlled by the test command to move the first carrier plate to selectively align the first area with the first light path,
   wherein the focus adjustment module further comprises a second carrier plate, the second carrier plate has a third area, a third light transmitting member is disposed in the third area, and the focus adjustment module is further controlled by the test command to move the second carrier plate to selectively align the third area with the first light path,
   wherein a beam characteristic of the third testing light received by the photographing lens is further measured.

2. The optoelectronic unit measuring device according to claim 1, wherein when the first area is aligned with the first light path, the first light transmitting member is used to refract the third testing light, and the third testing light is adjusted to focus at the first focus position.

3. The optoelectronic unit measuring device according to claim 2, wherein the first carrier plate has a second area, a second light transmitting member is disposed in the second area, and the focus adjustment module is further controlled by the test command to move the first carrier plate to selectively align the first area or the second area with the first light path.

4. The optoelectronic unit measuring device according to claim 3, wherein when the second area is aligned with the first light path, the second light transmitting member is used to refract the third testing light, and the third testing light is adjusted to focus at the second focus position, the second focus position is different from the first focus position.

5. The optoelectronic unit measuring device according to claim 4, wherein the first light transmitting member and the second light transmitting member are both transparent flat plates, the first light transmitting member and the second light transmitting member have the same refractive index, and the thickness of the first light transmitting member and the thickness of the second light transmitting member are not the same.

6. The optoelectronic unit measuring device according to claim 4, wherein the first light transmitting member and the second light transmitting member are both transparent flat plates, the first light transmitting member and the second light transmitting member have different refractive indexes.

7. The optoelectronic unit measuring device according to claim 2, wherein the first carrier plate further has a through hole, the focus adjustment module is further controlled by the test command to move the first carrier plate to selectively align the first area or the through hole with the first light path.

8. The optoelectronic unit measuring device according to claim 7, wherein when the through hole is aligned with the first light path, the focus position of the third testing light is the second focus position, and the second focus position is different from the first focus position.

9. The optoelectronic unit measuring device according to claim 1, wherein when the photographing lens measures the beam characteristics of the third testing light, the beam characteristics of the third testing light comprises a beam waist, a divergence angle, and a numerical aperture of the third testing light.

10. The optoelectronic unit measuring device according to claim 1, wherein a relative position of the imaging lens and the photographing lens is fixed.

11. The optoelectronic unit measuring device according to claim 1, further comprising:
- a first filter, disposed in the first light path and located between the objective lens and the imaging lens, for reducing a light intensity of the second testing light.

12. The optoelectronic unit measuring device according to claim 1, wherein the photographing lens is located at a focal plane of a light exiting side of the imaging lens in the first light path.

13. The optoelectronic unit measuring device according to claim 1, wherein the first testing light is emitted by an optoelectronic unit, and the optoelectronic unit is located at a focal plane of an incident side of the objective lens in the first light path.

* * * * *